(No Model.) 2 Sheets—Sheet 1.

A. DE KHOTINSKY.
SECONDARY ELECTRIC BATTERY.

No. 347,231. Patented Aug. 10, 1886.

Witnesses.
Percy B. Hills.
Robert Everett

Inventor.
Achilles de Khotinsky.
By James L. Norris.
Atty.

(No Model.) 2 Sheets—Sheet 2.

A. DE KHOTINSKY.
SECONDARY ELECTRIC BATTERY.

No. 347,231. Patented Aug. 10, 1886.

Witnesses.
Vinton Coombe
Robert Prevett

Inventor.
Achilles de Khotinsky,
By
James L. Norris,
Atty.

UNITED STATES PATENT OFFICE.

ACHILLES DE KHOTINSKY, OF ROTTERDAM, NETHERLANDS.

SECONDARY ELECTRIC BATTERY.

SPECIFICATION forming part of Letters Patent No. 347,231, dated August 10, 1886.

Application filed March 9, 1886. Serial No. 194,630. (No model.) Patented in England January 14, 1886, No. 611.

*To all whom it may concern:*

Be it known that I, ACHILLES DE KHOTINSKY, a subject of the Emperor of Russia, residing at Rotterdam, Netherlands, have invented a new and useful Secondary Electric Battery, (for which application for patent in Great Britain has been made January 14, 1886, No. 611,) of which the following is a specification.

My invention relates to a construction of secondary voltaic battery which I will describe, referring to the accompanying drawings.

Figure 1:
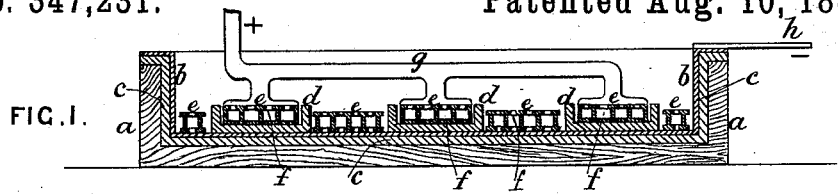
Figure 2:
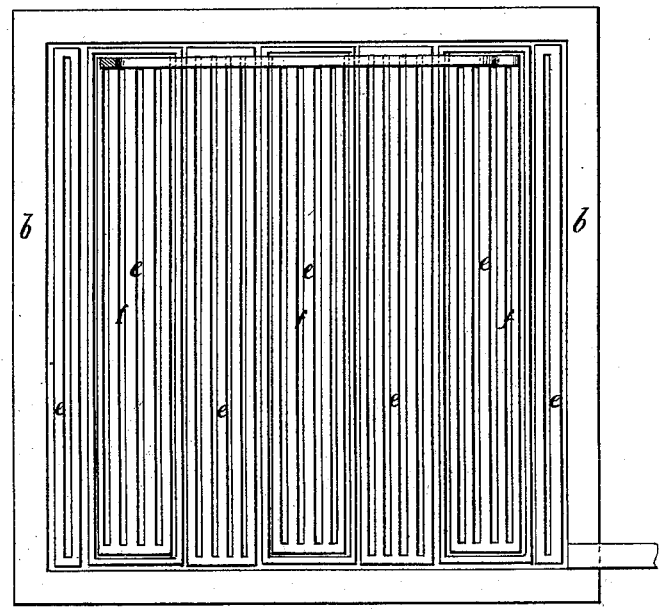
Figure 3:
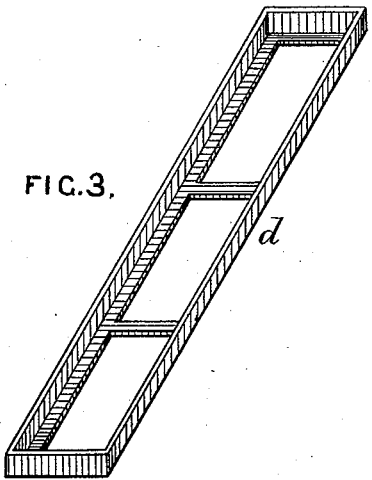

Figure 1 is a transverse section of one cell or compartment of a battery according to my invention. Fig. 2 is a plan of the cell. Fig. 3 is a perspective view of one of the troughs for holding the positive electrodes, and Fig. 4 is a sectional view showing a series of trays placed one above the other.

$a$ is a shallow box or tray, which may be of wood or other convenient material, preferably of low conducting power. $b$ is a second tray, made of sheet-lead, which is within the tray $a$ with a layer, $c$, of bitumen or other suitable insulating and water-proof substance interposed between $a$ and $b$. On the leaden bottom of the tray are placed parallel to one another several shallow troughs, $d$, made of ebonite or other suitable insulating material. The bottoms of these troughs $d$ may be partly open, as shown in Fig. 3. In each of the troughs $d$ is laid a skeleton frame, $e$, made of lead or lead a little alloyed with tin or other white metal, this frame presenting on its upper face numerous grooves, $f$, divided by partitions, each made with inwardly-projecting lips, so as the better to retain the material which is packed into the grooves. All the frames $e$ are soldered at one end to a bar, $g$, which is the positive terminal of the compartment. The negative terminal $h$ is soldered to any part of the lead lining $b$. The grooves $f$ are filled with spongy lead or peroxide of lead mixed with low oxide of lead or metallic lead. In the spaces between the troughs $d$ may be placed also frames $e$, or separate bars of lead, and also spongy lead, which, however, is not necessary.

Figure 4:
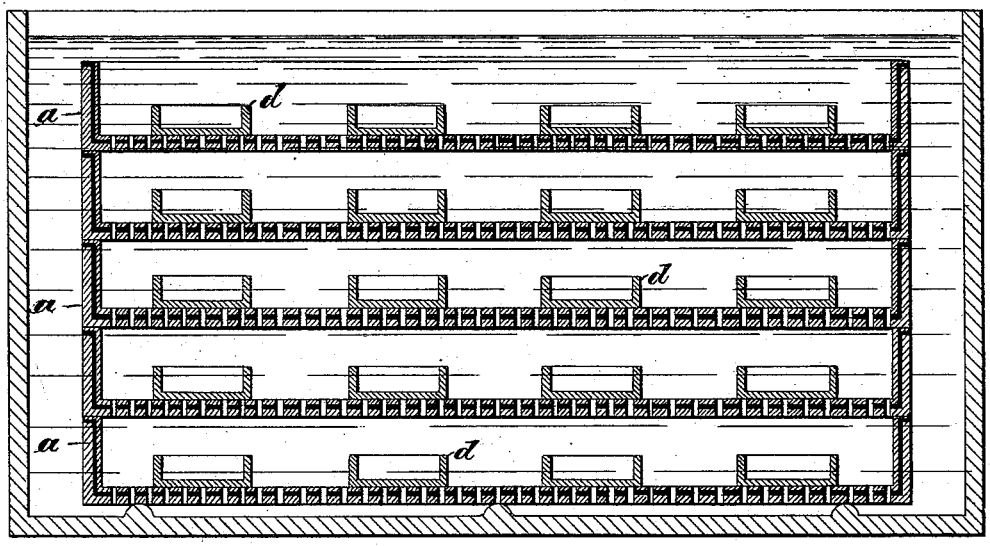

A number of the shallow boxes or trays, made as described, may be placed one above another within a box charged with suitable exciting-liquid, as shown in Fig. 4. In this case the bottoms of the trays are perforated with numerous holes to allow free circulation of the liquid.

Having thus described the nature of my invention, and the best means I know of carrying it out in practice, I claim—

A secondary battery consisting of cells, each of which is a shallow box or tray of wood or other like material lined with bitumen or equivalent substance and sheet-lead, and contains parallel shallow troughs of insulating material in which are laid skeleton metallic frames, all connected at one end to one terminal of the cell, while the other terminal is connected to the lead lining, the skeleton frames and the spaces between the troughs containing them being charged with the elements of the battery and the exciting-liquid, substantially as herein described.

In testimony whereof I have signed my name to this specification, in the presence of two subscribing witnesses, this 18th day of February, A. D. 1886.

ACHILLES DE KHOTINSKY.

Witnesses:
H. ENGELEN,
LEONARD KOOT.